M. HINKLEY.
MACHINE FOR MAKING BERRY BOXES.
APPLICATION FILED DEC. 19, 1907.
1,188,778.
Patented June 27, 1916.
7 SHEETS—SHEET 1.
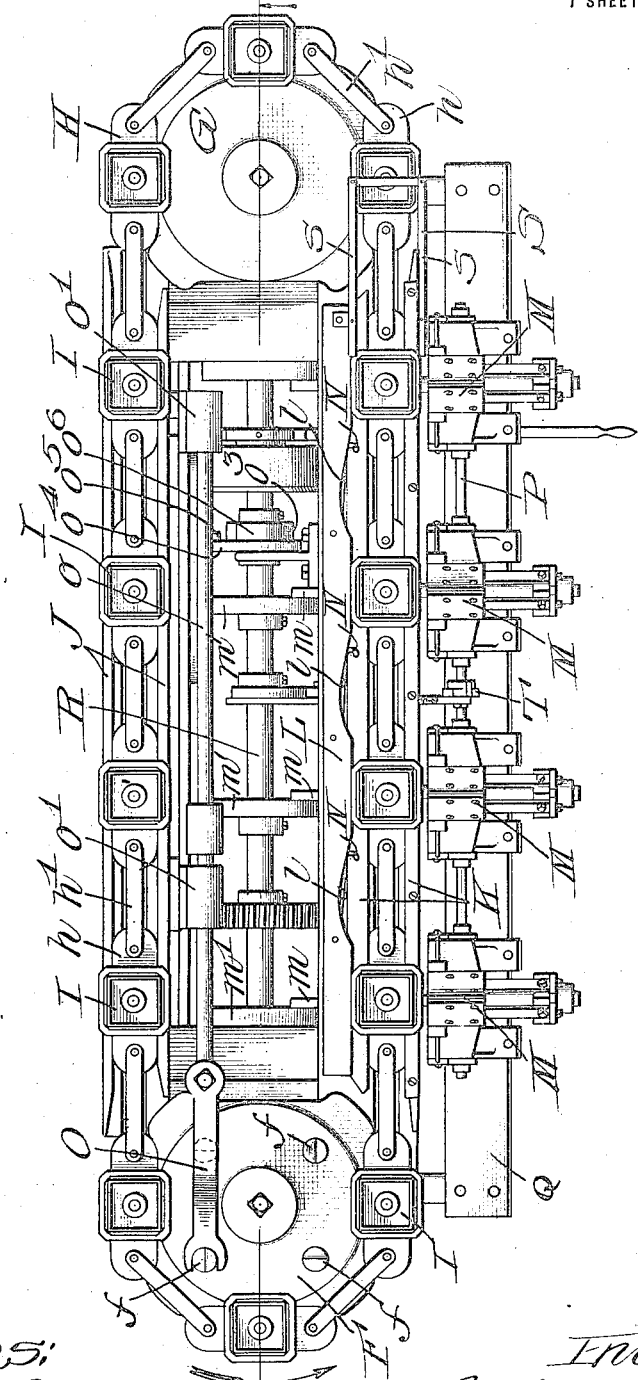

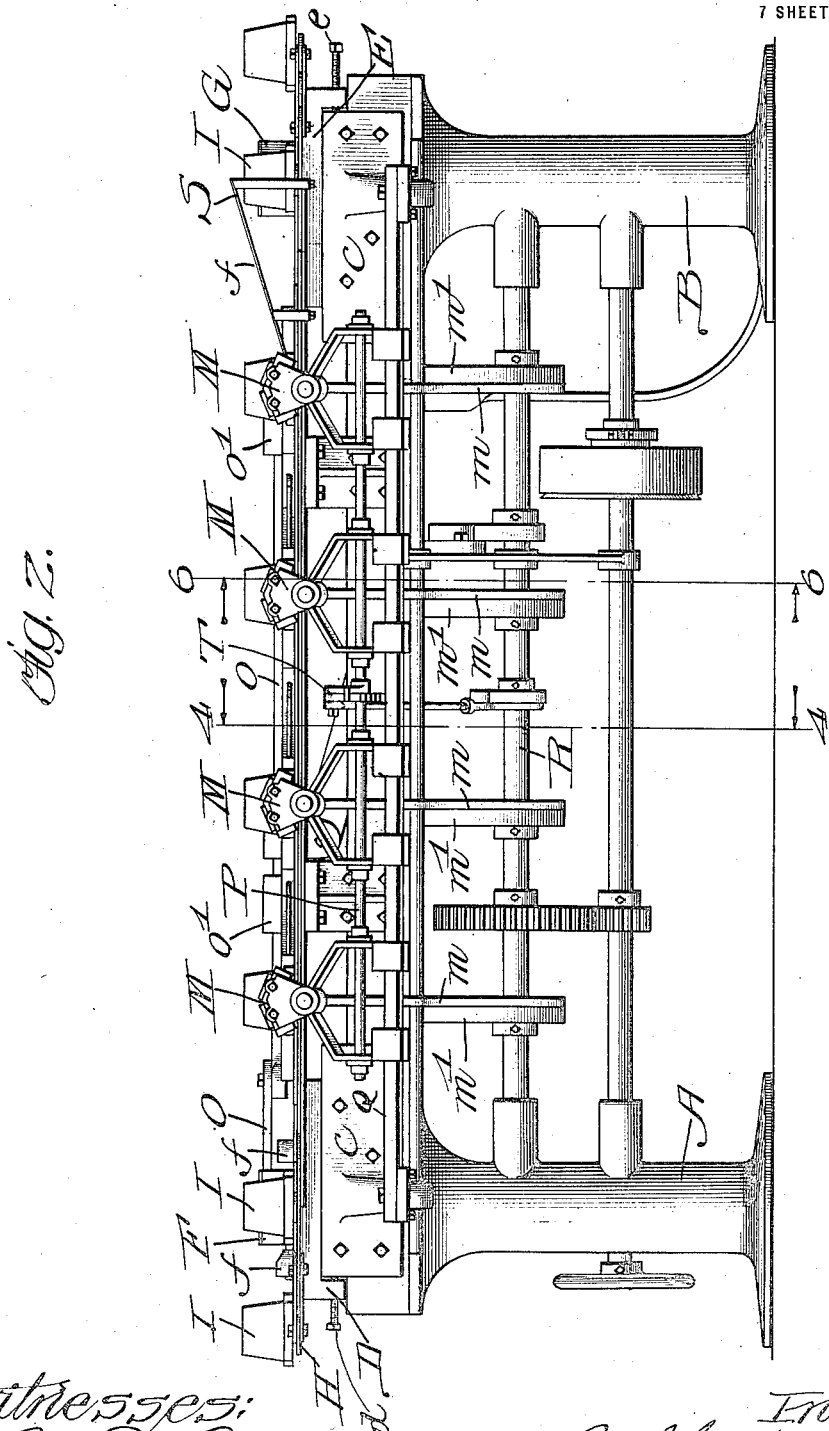

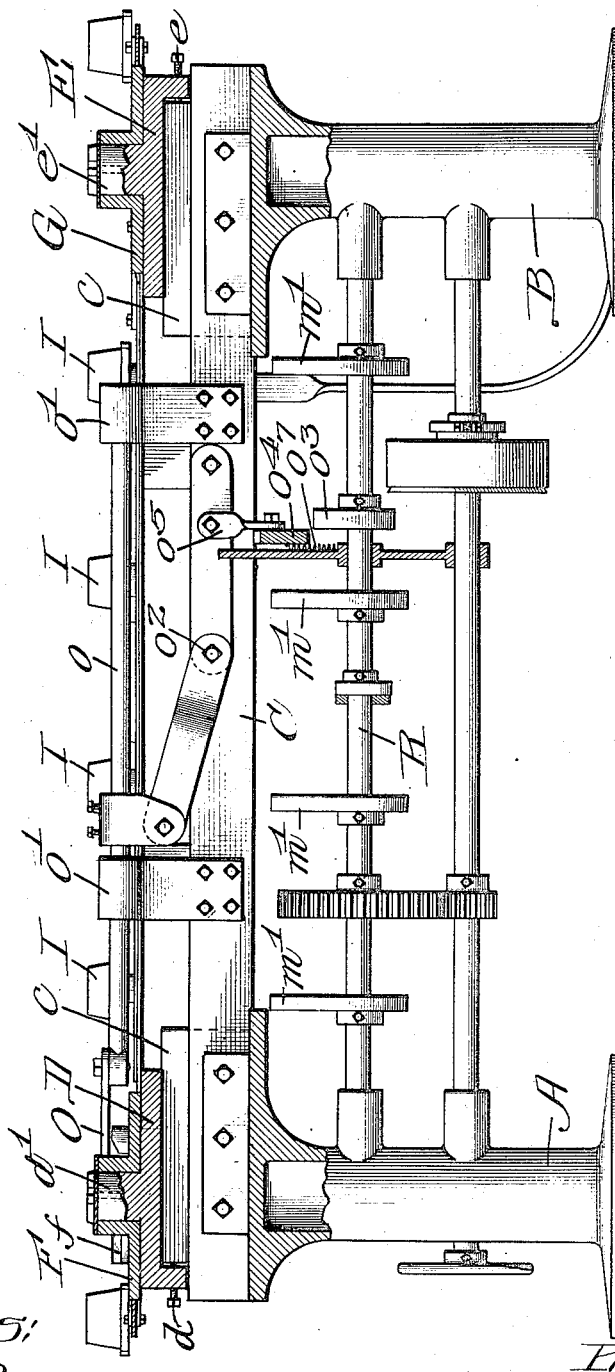

M. HINKLEY.
MACHINE FOR MAKING BERRY BOXES.
APPLICATION FILED DEC. 19, 1907.
1,188,778.
Patented June 27, 1916.
7 SHEETS—SHEET 4.
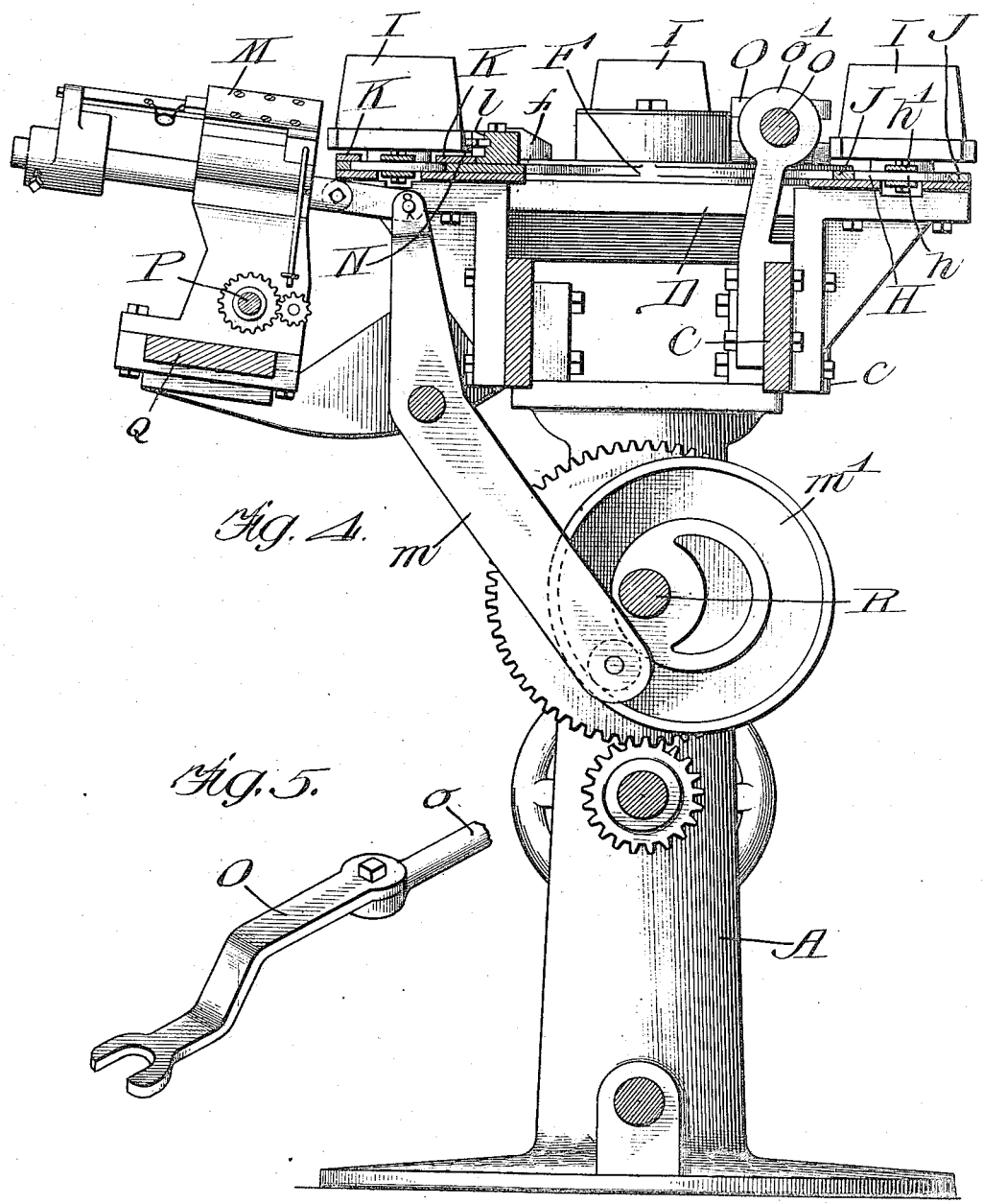

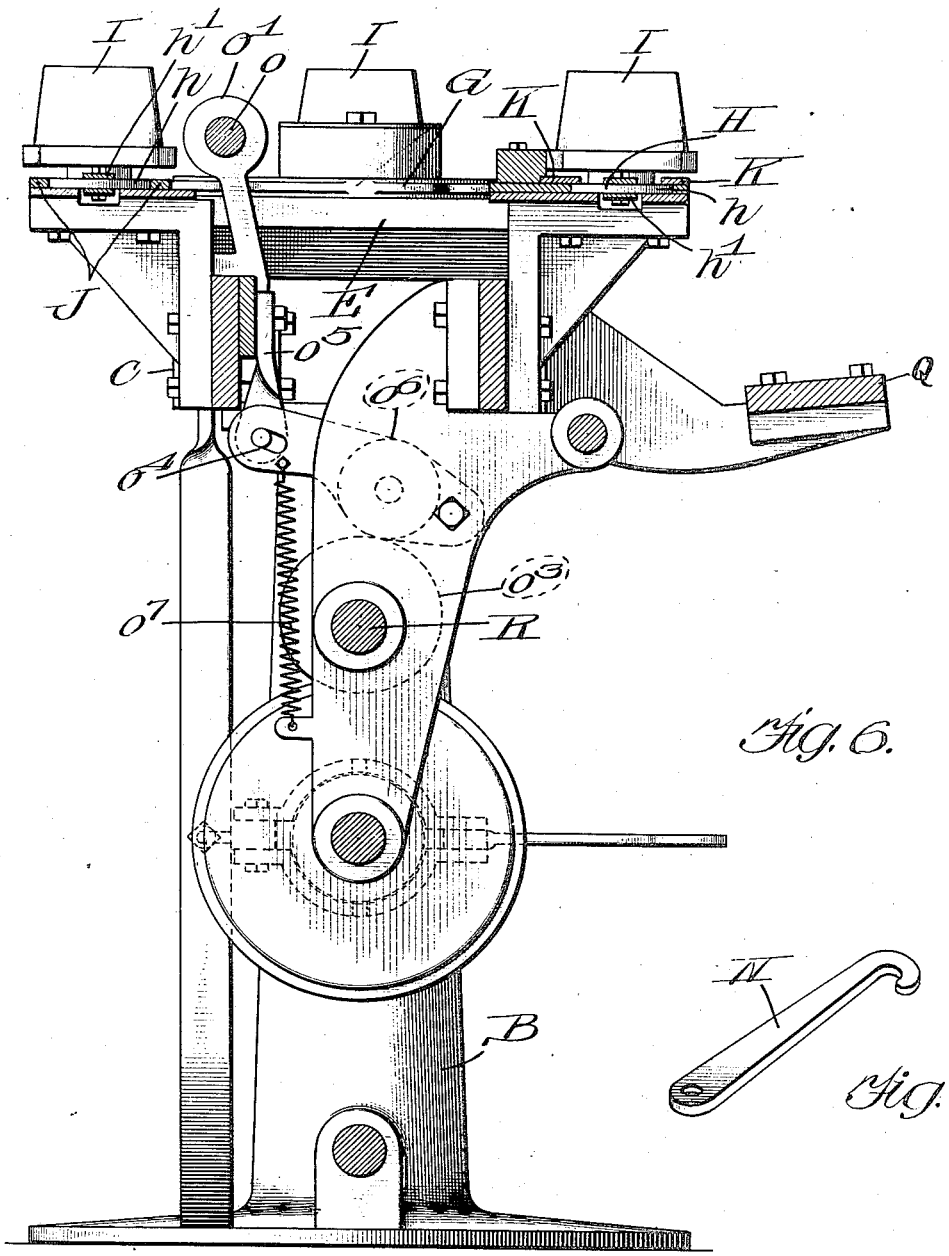

M. HINKLEY.
MACHINE FOR MAKING BERRY BOXES.
APPLICATION FILED DEC. 19, 1907.
1,188,778.
Patented June 27, 1916.
7 SHEETS—SHEET 6.
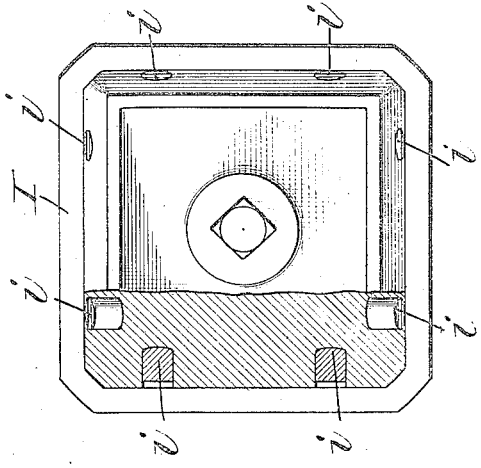
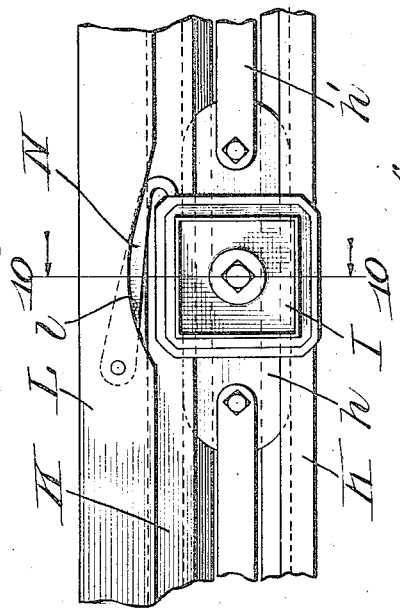
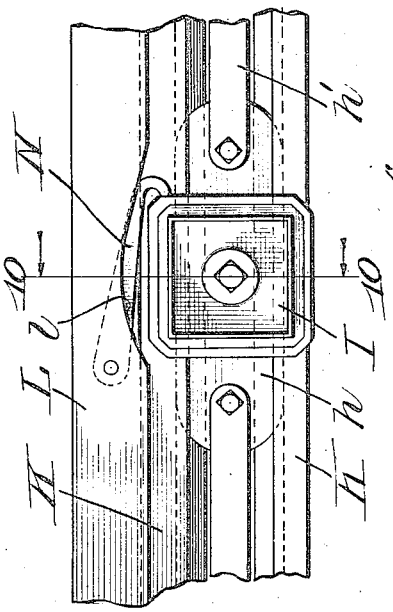
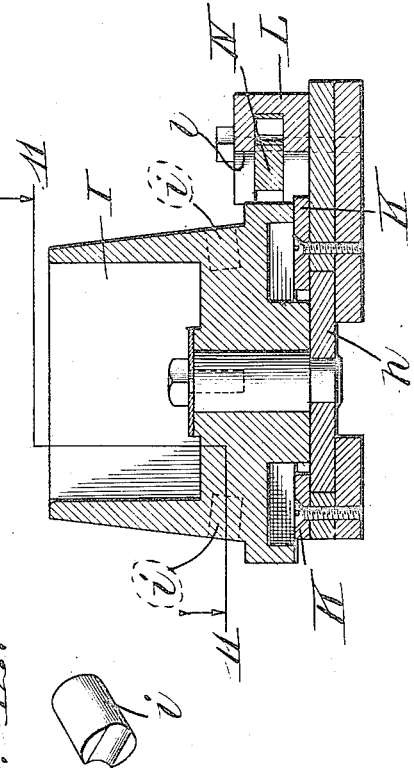

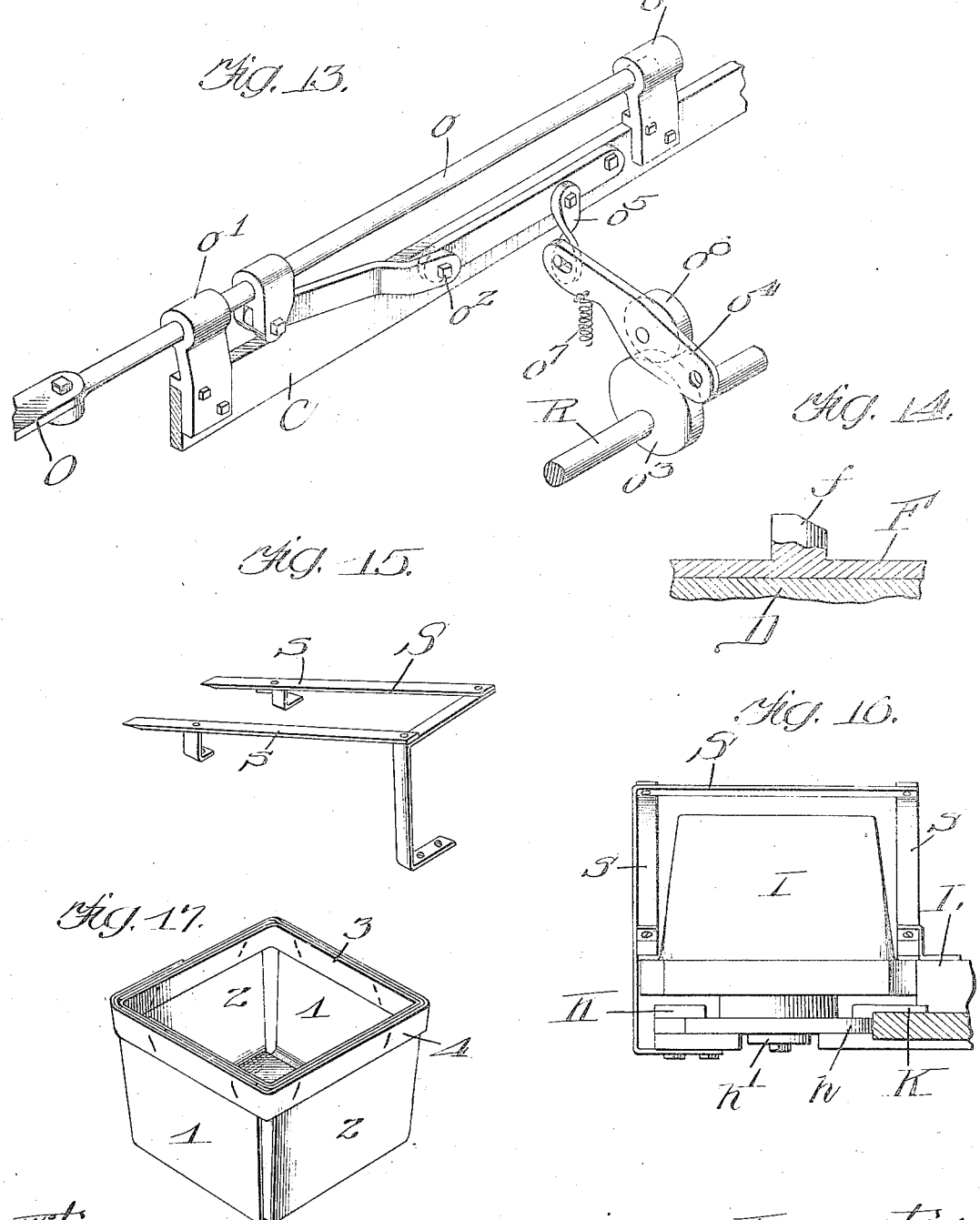

UNITED STATES PATENT OFFICE.

MILTON HINKLEY, OF BENTON HARBOR, MICHIGAN, ASSIGNOR TO SARANAC MACHINE COMPANY, OF BENTON HARBOR, MICHIGAN, A CORPORATION OF MICHIGAN.

MACHINE FOR MAKING BERRY-BOXES.

1,188,778.  Specification of Letters Patent.  Patented June 27, 1916.

Application filed December 19, 1907. Serial No. 407,107.

*To all whom it may concern:*

Be it known that I, MILTON HINKLEY, a citizen of the United States of America, and resident of Benton Harbor, Berrien county, Michigan, have invented a certain new and useful Improvement in Machines for Making Berry-Boxes, of which the following is a specification.

Broadly considered, my invention relates to machines for making receptacles.

More specifically considered, my invention relates to machinery for making berry boxes of the kind that are somewhat in the nature of baskets, each box being composed of sheets of veneer crossed and bent into shape to provide the sides and bottom, and of a rim formed by applying inner and outer strips around the upper edges of the said sides, this being a common form of quart box or basket for berries or other fruit.

The principal object of my invention is to provide a machine having a novel and improved construction of such character that boxes or baskets or receptacles can be produced rapidly and in large quantities and at a reduced cost of manufacture.

It is also an object to provide certain details of construction tending to increase the general efficiency of a machine of this particular character.

To this and other useful ends, my invention consists in matters herein after set forth and claimed.

In the accompanying drawings, Figure 1 is a plan of a machine for making berry boxes, embodying the principles of my invention. Fig. 2 is a side elevation of the same. Fig. 3 is a longitudinal section on line 3—3 in Fig. 1. Fig. 4 is an enlarged cross section on line 4—4 in Fig. 2. Fig. 5 is a perspective of the feed pawl of the feed mechanism. Fig. 6 is an enlarged cross section on line 6—6 in Fig. 2. Fig. 7 is a perspective of one of the hooks or dogs for automatically rotating the forms on which the boxes are stapled. Fig. 8 is an enlarged detail plan of one of the forms and adjacent parts. Fig. 9 is a similar view showing the form rotated to a different position. Fig. 10 is an enlarged section on line 10—10 in Fig. 8. Fig. 11 is a broken section on line 11—11 in Fig. 10. Fig. 12 is a perspective of one of the clutch blocks or anvils with which the sides of each form are provided. Fig. 13 is a perspective of the mechanism for actuating the feed pawl by which the forms are caused to travel around and pass in front of the staplers. Fig. 14 is an enlarged detail fragmentary view of one of the teeth or pins engaged by the feed pawl. Fig. 15 is a perspective of the stripper for automatically removing the boxes from the forms after being stapled together. Fig. 16 is an end elevation of said stripper, showing adjacent parts. Fig. 17 is a perspective of a berry box or basket of the kind produced by the machine illustrated by the drawings.

For convenience of description, the product will hereinafter be referred to as a berry box, although it will be understood that I do not so limit myself, particularly in so far as the different novel features and combinations of my invention may be found useful in the manufacture of other articles.

As shown in Fig. 17, the said berry box comprises two sheets of veneer 1 and 2, crossed and bent up to provide a bottom and sides, and a rim composed of inner and outer hoops 3 and 4, the box being square in plan view.

Referring to Figs. 1 to 3 inclusive, it will be seen that the machine comprises two upright members or standards A and B rigidly connected by horizontal and parallel beams or frame members C. Above the said standards the bracket plates $c$ are secured to the said side beam C, there being two of these bracket plates at each end of the machine. The bearing plates D and E are supported on said bracket plates, and are adjustable toward and away from each other by means of set screws $d$ and $e$ which extend through the ends of said plates and engage the ends of the plates $c$. The said bearing plates are provided respectively with studs $d^1$ and $e^1$ which serve as journals for the sprocket wheels F and G, said wheels being thus adapted to rotate in horizontal planes and about vertical axes. A sprocket chain H is arranged to travel upon and around said sprocket wheels, said chain being composed of alternate single links $h$ and intermediate double links $h^1$, the links $h$ being broader than the others. The forms I are mounted upon the links $h$ and are adapted to rotate thereon each form being rotatable about a vertical axis. These forms are approximately square—that is, each form is square in plan view, but slightly tapered to conform to the shape of the box. Each form is provided with clench blocks or anvils $i$ (see Fig. 12) upon which are clenched the staples which secure the loops to the veneer. In this way there are as many forms I as there are links $h$, and these forms travel along one side of the machine, where they are loaded, and then back at the other side of the machine, where the boxes are stapled. At the side where the forms are loaded the links $h$ travel in guides J, and at the other side, where the forms are subject to the pressure of the staplers, the said links travel in guides K. The said guides K are adapted to hold the links $h$ against upward displacement, but this is not necessary in the case of the guides J. A guide L is provided for holding the forms against the thrust of the staplers, and is provided with recesses $l$ which permit the forms to turn in moving from one stapler to another. But while the forms are traveling at the other side of the machine they are obviously rotatable by hand if so desired.

The staplers M are arranged in a row at the front of the machine, and are of any suitable character. While passing from one stapler to another, each form is rotated or given a quarter turn by one of the hooks or dogs N. (See Figs. 8 and 9). The staplers are operated in unison, and while the front box is receiving the first staples the fourth or last box is receiving the last staples. In other words, there are as many staplers as there are sides to the box, and each box is acted on by four stapler heads before it is finished. As shown, each stapler head is double, so that each side of the box receives two staples. It will also be seen that said staples are driven in the rim of the box to secure the square hoops to the veneer. It will be seen that the sprocket wheel F has teeth or pins $f$ which are engaged by the feed pawl O. Said pawl is pivotally secured to the end of a rod $o$, which latter is mounted in bearings $o^1$. This rod is actuated by a toggle $o^2$, which latter is in turn operated by a cam $o^3$ through the medium of the lever $o^4$ having a roll $o^6$ and the link $o^5$. It will be seen that the lever $o^4$ having a roll $o^6$ engages said cam. There are four of the teeth $f$ and consequently the feed mechanism moves the endless series of forms one-quarter of the required distance each time the pawl O moves forward. In other words, the traveling series of forms moves the distance between any two forms each time the pawl is actuated. A spring $o^7$ retracts the toggle and pawl. A common shaft P operates the wire feeding devices of all of said staplers. Said staplers are mounted on a common support Q which extends along the side of the machine. A shaft R extends from one end of the machine to the other. Each stapler is actuated by a lever $m$ which engages a cam $m^1$ on said shaft. This shaft can be driven by any suitable arrangement.

At the discharge end of the machine a stripper S is arranged in position to automatically remove the finished boxes from the forms. This stripper has two parallel inclines $s$—$s$ which are in line with the sides of the box, and up which the box slides as the chain moves forward. The said stripper can be secured to the frame of the machine in any suitable manner.

With the machine thus constructed the veneer and hoops are placed upon the forms at one side of the machine, in any suitable manner, and the hoops are then stapled to the veneer at the other side of the machine. A box is completed each time the stapler head move forward. This affords a great saving in time and labor, and reduces the cost of production. The shaft P for the wire-feed is operated by a ratchet T suitably connected with the shaft R, as shown. I do not limit myself to the exact construction shown and described.

What I claim as my invention is:

1. A stapling machine comprising an endless link belt, sprocket wheels for said belt, rotary forms on said belt, the axes of said forms being parallel with the axes of said wheels, a plurality of staplers disposed opposite some of said forms, there being as many staplers as there are sides for each form, means for intermittently actuating said wheels and belt to carry the forms from one stapler to the next, means for operating said staplers simultaneously, a track having straight edges for engaging said forms to prevent rotation thereof while in front of said staplers, said track having gaps therein to permit rotation of the forms between the staplers, and devices for engaging the forms to cause said rotation thereof, said link belt having parallel straight portions, said staplers being arranged in a row parallel with said straight portions of the belt, and said straight track edges serving as backing for the forms while subject to the pressure of said staplers.

2. A stapling machine comprising an endless link belt, sprocket wheels for said belt, rotary forms on said belt, the axes of said forms being parallel with the axes of said wheels, a plurality of staplers disposed opposite some of said forms, there being as many staplers as there are sides for each form, means for intermittently actuating said wheels and belt to carry the forms from one stapler to the next, means for operating said staplers simultaneously, a track having straight edges for engaging said forms to prevent rotation thereof while in front of said staplers, said track having gaps therein to permit rotation of the forms between the staplers, and devices for engaging the forms to cause said rotation thereof, said link belt having parallel straight portions, said staplers being arranged in a row parallel with said straight portions of the belt, and said straight track edges serving as backing for the forms while subject to the pressure of said staplers, said devices including pivoted hooks disposed in the path of the corners of said forms, and springs for yieldingly holding said hooks in position.

3. A stapling machine comprising an endless link belt, sprocket wheels for said belt, rotary forms on said belt, the axes of said forms being parallel with the axes of said wheels, a plurality of staplers disposed opposite some of said forms, there being as many staplers as there are sides for each form, means for intermittently actuating said wheels and belt to carry the forms from one stapler to the next, means for operating said staplers simultaneously, a track having straight edges for engaging said forms to prevent rotation thereof while in front of said staplers, said track having gaps therein to permit rotation of the forms between the staplers, and devices for engaging the forms to cause said rotation thereof, said link belt having parallel straight portions, said staplers being arranged in a row parallel with said straight portions of the belt, and said straight track edges serving as backing for the forms while subject to the pressure of said staplers, each form being adapted to hold a basket upside down, and there always being a plurality of said forms in position to be loaded at one side of the machine while other forms are coöperating with said staplers at the other side of the machine.

4. A stapling machine comprising an endless link belt, sprocket wheels for said belt, rotary forms on said belt, the axes of said forms being parallel with the axes of said wheels, a plurality of staplers disposed opposite some of said forms, there being as many staplers as there are sides for each form, means for intermittently actuating said wheels and belt to carry the forms from one stapler to the next, means for operating said staplers simultaneously, a track having straight edges for engaging said forms to prevent rotation thereof while in front of said staplers, said track having gaps therein to permit rotation of the forms between the staplers, and devices for engaging the forms to cause said rotation thereof, said link belt having parallel straight portions, said staplers being arranged in a row parallel with said straight portions of the belt, and said straight track edges serving as backing for the forms while subject to the pressure of said staplers, and guides for supporting the straight portions of said belt, said forms all operating in a fixed plane above said guides.

5. A stapling machine comprising a plurality of staplers arranged in a straight row, an endless series of rotary forms, the axes of said forms always being parallel, means for carrying said forms from one stapler to the next, means for automatically rotating the forms between said staplers, means for operating said staplers simultaneously to drive staples in the same direction, and means for holding the forms against rotation while opposite said staplers, arranged to brace the forms against the thrust of the staplers, the said forms being greater in number than said staplers, and there always being a plurality of said forms in position for complete loading while other forms are coöperating with said staplers.

6. A stapling machine comprising a plurality of staplers arranged in succession, an endless series of rotary forms, the axis of said forms always being parallel, means for carrying said forms from one stapler to the next, means for rotating the forms between said staplers, means for operating said staplers simultaneously, and means for holding the forms against rotation while opposite said staplers, the said forms being greater in number than said staplers, and there always being a plurality of said forms in position for complete loading while other forms are coöperating with said staplers, the said loading and stapling positions of the forms being at opposite sides of the machine, and the number of forms at all times in position for loading being never less than the number of staplers.

7. A machine for making receptacles, comprising an endless series of forms, mechanism for moving the forms bodily, means for mounting the forms so that each is rotatable about an individual axis, a plurality of staplers disposed adjacent the path of travel of said forms, devices for automatically and partially rotating each form as it travels from one stapler to the next, and means for holding the forms against rotation while in front of said staplers, said forms being freely rotatable while traveling around from the last stapler to the first stapler.

8. A machine for making receptacles, comprising an endless series of forms, mechanism for moving the forms bodily, means for mounting the forms so that each is rotatable about an individual axis, a plurality of staplers disposed adjacent the path of travel of said forms, devices for automtically and partially rotating each form as it travels from one stapler to the next, and means for holding the forms against rotation while in front of said staplers, said forms being rotatable while traveling around from the last stapler to the first stapler, said devices comprising pivoted hooks and means on the forms to engage said hooks.

9. A machine for making receptacles, comprising an endless series of forms, mechanism for moving the forms bodily, means for mounting the forms so that each is rotatable about an individual axis, a plurality of staplers disposed adjacent the path of travel of said forms, devices for automatically and partially rotating each form as it travels from one stapler to the next, and means for holding the forms against rotation while in front of said staplers, said forms being rotatable while traveling around from the last stapler to the first stapler, said mechanism including an intermittently operated feed device each forward stroke of which is sufficient to carry the forms from one stapler to the next by one continuous motion.

10. A machine for making receptacles, comprising an endless series of forms, mechanism for moving the forms bodily, means for mounting the forms so that each is rotatable about an individual axis, a plurality of staplers disposed adjacent the path of travel of said forms, devices for automatically and partially rotating each form as it travels from one stapler to the next, and means for holding the forms against rotation while in front of said staplers, said forms being rotatable while traveling around from the last stapler to the first stapler, said staplers being arranged in a straight row, and means to guide the forms along a straight line of travel in front of said staplers, in combination with an operating shaft common to said staplers and provided with a guiding cam for each stapler.

11. A machine for making receptacles, comprising an endless series of forms, mechanism for moving the forms bodily, means for mounting the forms so that each is rotatable about an individual axis, a plurality of staplers disposed adjacent the path of travel of said forms, devices for automatically and partially rotating each form as it travels from one stapler to the next, and means for holding the forms against rotation while in front of said staplers, said forms being rotatable while traveling around from the last stapler to the first stapler, said mechanism including a link belt upon which the forms are mounted, means for guiding said link belt, and an intermittently actuated feed device for periodically operating said link belt to move the forms from one stapler to the next by one continuous motion.

Signed by me at Benton Harbor, Michigan, this fifth day of December 1907.

MILTON HINKLEY.

Witnesses:
M. FRED HINKLEY,
JOHN T. OWENS.